(12) United States Patent
Yasuda

(10) Patent No.: US 8,290,663 B2
(45) Date of Patent: *Oct. 16, 2012

(54) VEHICLE ELECTRONIC CONTROL SYSTEM, VEHICLE ELECTRONIC CONTROL UNIT, AND VEHICLE CONTROL SYNCHRONIZATION METHOD

(75) Inventor: Takeshi Yasuda, Kuwana (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/160,565

(22) Filed: Jun. 15, 2011

(65) Prior Publication Data

US 2011/0245934 A1    Oct. 6, 2011

Related U.S. Application Data

(63) Continuation of application No. PCT/JP2008/073342, filed on Dec. 22, 2008.

(51) Int. Cl.
*G06F 7/00* (2006.01)
(52) U.S. Cl. ............ 701/36; 701/34.3; 701/34.4; 700/2
(58) Field of Classification Search ............... 701/36, 701/29.7, 34.3, 34.4; 700/2, 8, 79
See application file for complete search history.

(56) References Cited

U.S. PATENT DOCUMENTS

| 6,282,578 | B1 | 8/2001 | Aizono et al. | |
|---|---|---|---|---|
| 6,493,593 | B1 * | 12/2002 | Kamiya et al. | 700/2 |
| 2001/0034755 | A1 | 10/2001 | Aizono et al. | |
| 2005/0216135 | A1 * | 9/2005 | Sayama et al. | 701/1 |
| 2008/0271035 | A1 | 10/2008 | Yasukawa | |

FOREIGN PATENT DOCUMENTS

| JP | 63-40959 | 2/1988 |
|---|---|---|
| JP | 2-162860 | 6/1990 |
| JP | 8-235001 | 9/1996 |
| JP | 9-6695 | 1/1997 |
| JP | 2001-306487 | 11/2001 |
| JP | 2002-82927 | 3/2002 |

(Continued)

OTHER PUBLICATIONS

International Search Report mailed Mar. 24, 2009 in PCT/JP2008/073342 filed Dec. 22, 2008 (with English Translation).

(Continued)

*Primary Examiner* — Gertrude Arthur Jeanglaude
(74) *Attorney, Agent, or Firm* — Oblon, Spivak, McClelland, Maier & Neustadt, L.L.P.

(57) ABSTRACT

A vehicle electronic control system includes a first electronic control unit executing a control process A, and a second electronic control unit connected to the first electronic control unit and executing a control process B inseparable from the control process A. The first electronic control unit includes a synchronization signal transmit unit transmitting a synchronization signal to the second electronic control unit; and a first control process execution unit starting execution of the control process A after transmission of the synchronization signal. The second electronic control unit includes a synchronization signal receive unit receiving the synchronization signal from the first electronic control unit; a first time measuring unit measuring a predetermined time Tb since reception of the synchronization signal; and a second control process execution unit starting execution of the control process B when the predetermined time Tb elapses.

19 Claims, 15 Drawing Sheets

FOREIGN PATENT DOCUMENTS

| | | |
|---|---|---|
| JP | 2005-71280 | 3/2005 |
| JP | 2005-78244 | 3/2005 |
| JP | 2006-228192 | 8/2006 |
| JP | 2007-34910 | 2/2007 |
| JP | 2008-276331 | 11/2008 |

OTHER PUBLICATIONS

International Written Opinion mailed Mar. 24, 2009 in PCT/JP2008/073342 filed Dec. 22, 2008.

* cited by examiner

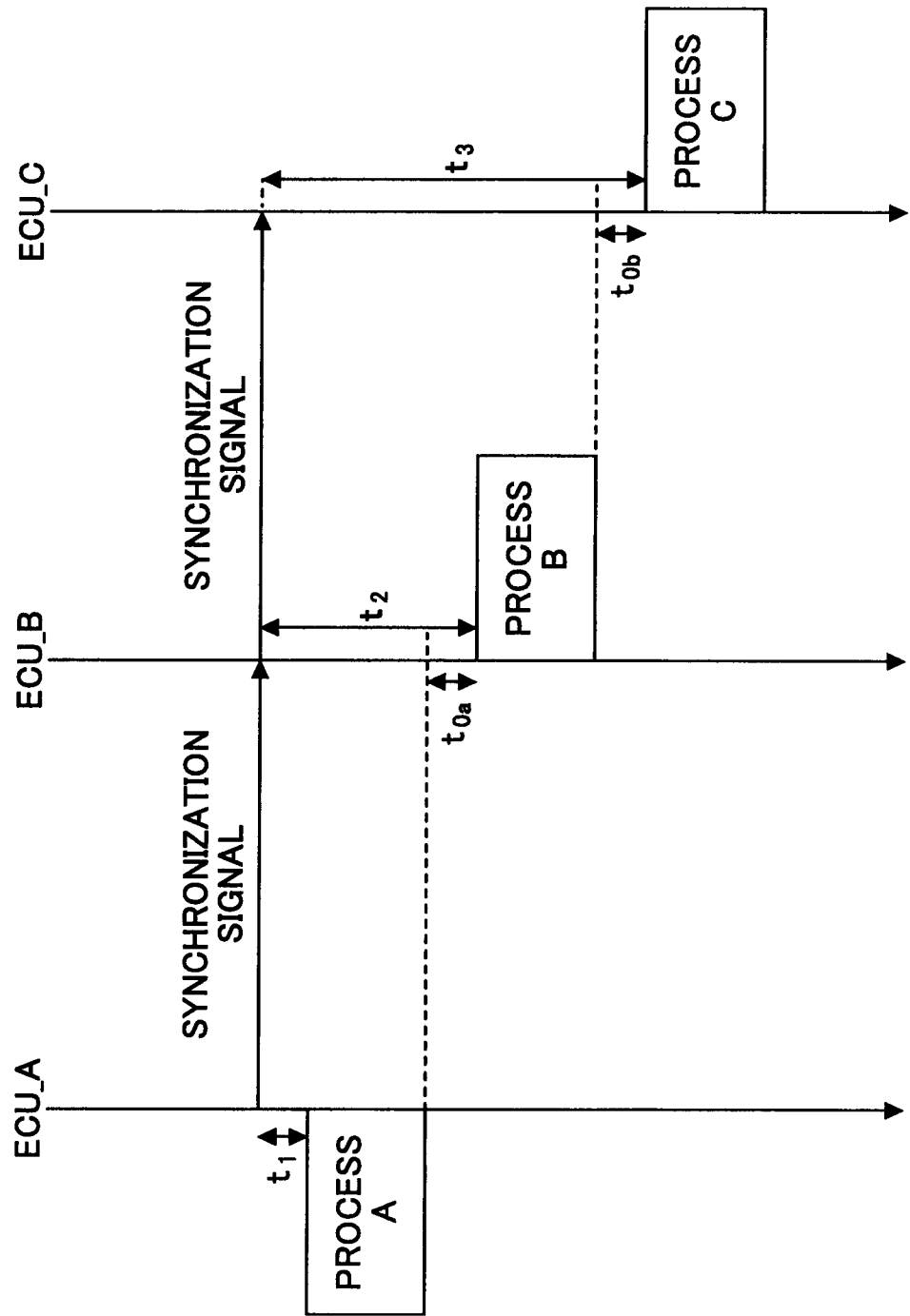

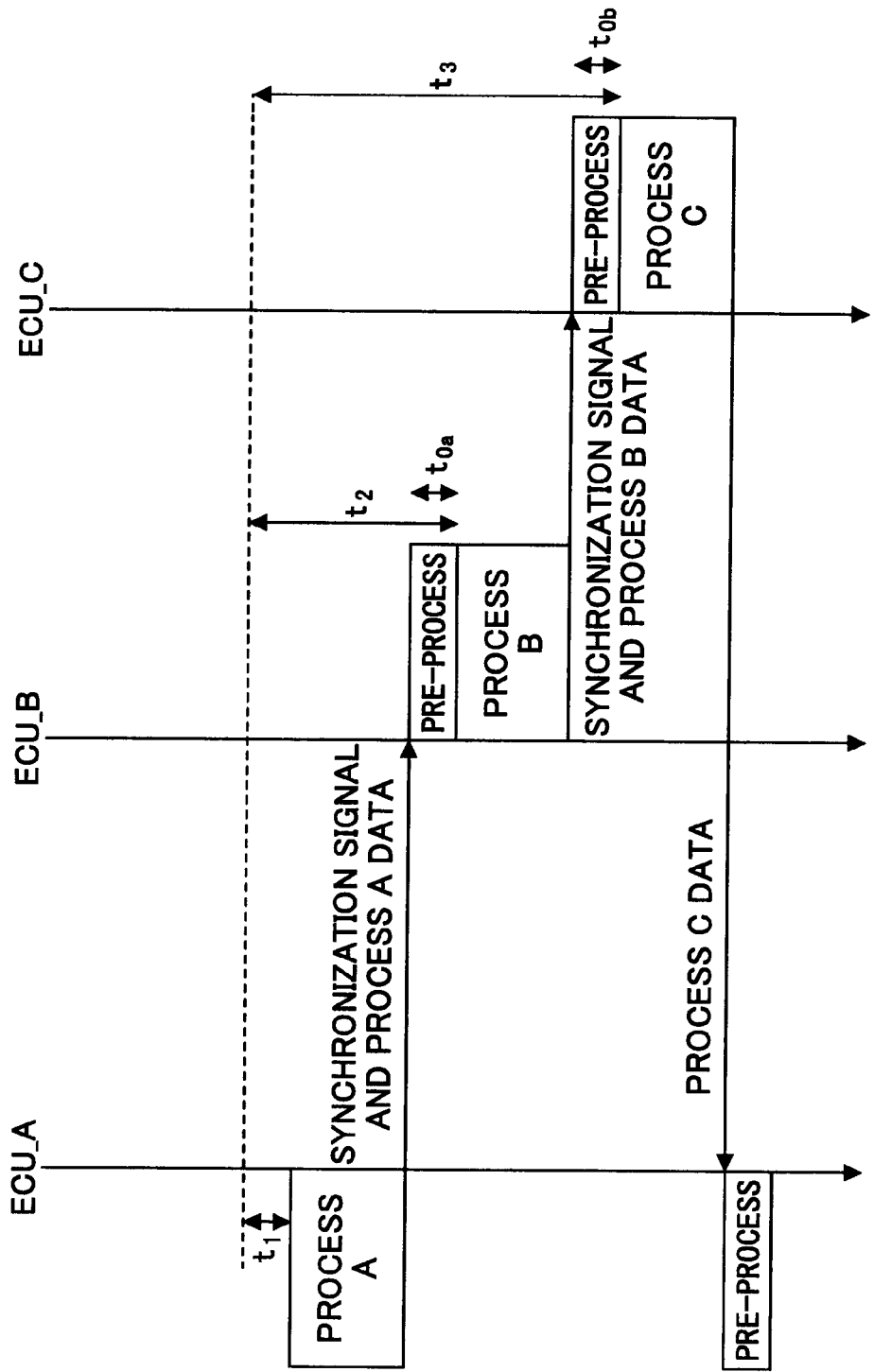

VEHICLE ELECTRONIC CONTROL SYSTEM, VEHICLE ELECTRONIC CONTROL UNIT, AND VEHICLE CONTROL SYNCHRONIZATION METHOD

CROSS-REFERENCE TO RELATED APPLICATION

This application is a U.S. continuation Application filed under 35 USC 111(a) claiming benefit under 35 USC 120 and 365(c) of PCT application JP2008/073342, filed Dec. 22, 2008. The foregoing application is hereby incorporated herein by reference.

BACKGROUND OF THE INVENTION

1. Field of the Invention

The disclosure herein relates to a vehicle electronic control system in which plural electronic control units are connected. Particularly, the disclosure relates to a vehicle electronic control system in which closely related processes are executed by separate electronic control units, a vehicle electronic control unit, and a vehicle control synchronization method.

2. Description of the Related Art

Electronic control units ("ECU") mounted on a vehicle are required to control increasingly sophisticated and complicated functions, and it is becoming increasingly difficult to implement all of the required functions on a single ECU. Processes which are preferably executed by a single ECU may be executed by separate ECUs. However, when a process that is preferably executed by a single ECU is divided into two processes, for example, the processes need to be synchronized because the divided processes are closely related to each other.

FIGS. 1A, 1B, and 1C illustrate an example of synchronization of two processes. FIG. 1A illustrates a chronological relationship of two processes A and B executed by a single ECU. Because the process A and the process B are closely related to each other, the ECU executes the process A and then starts to execute the process B (following a minimum required time for switching of the processes). For example, the ECU controls an actuator A based on a result of the process A and then controls a related actuator B based on a result of the process B. In this way, the two actuators can be controlled in a coordinated manner. Predetermined times (which may be referred to as "control periods") are allocated to the processes A and B. For example, a sufficient time for the process A is allocated to a control period A, and a sufficient time for the process B is allocated to a control period B.

FIGS. 1B and 1C illustrate examples of a chronological relationship between the processes A and B where the process A is processed by an ECU_A and the process B is processed by an ECU_B. The ECU_A and the ECU_B are electrically connected to each other. Unless the processes are synchronized between the ECU_A and the ECU_B, a desired chronological relationship between the processes A and B may be broken. For example, a blank time may arise between the end of the process A and the start of the process B (FIG. 1B), or the process B may be started when the process A is not yet completed (FIG. 1C). In the case of FIG. 1B, the control of an actuator B following the control of an actuator A is delayed. In the case of FIG. 1C, the actuator B cannot be properly controlled because the control of the process B is based on the result of the process A. Thus, in either case, the actuators A and B cannot be controlled in a smoothly coordinated manner.

According to a process synchronization technology discussed in Patent Document 1, in a clustered computer including plural computers, one computer notifies another computer of the start and end of a session in an asynchronous manner. Specifically, a master computer notifies a slave computer of the start and end timings of a parallel process portion.

In another technology discussed in Patent Document 2, processes are executed simultaneously by a master node and a slave node. Specifically, Patent Document 2 discusses a parallel computer in which a master node transmits a synchronization signal to a slave node, stands by for a pre-measured transmission time, and then executes a process simultaneously with the slave node.

However, when a process that is preferably executed by a single ECU is executed by separate ECUs, the response characteristics of the entire system are affected according to the synchronizing technology of Patent Document 1, resulting in the need for re-adaptation.

In the synchronizing technology according to Patent Document 2, although the transmission time is measured (estimated) in advance, it is difficult to completely match the execution times of the master node and the slave node. For example, if the slave node starts a process before the master node, the slave node may not be able to execute the process by utilizing the result of the process executed by the master node. Namely, the synchronizing technology according to Patent Document 2 does not take into consideration the case where a process that is preferably executed by a single ECU is executed by separate ECUs.

Thus, it has been difficult for the process synchronization methods according to the related art to synchronize two closely related processes so that the processes can be controlled in a synchronized manner. In this respect, in the case of a simple information process not related to control, not much of a problem may be caused even when the ECU_B fails to execute its process once. However, there has been no technology capable of addressing the need for controlling closely related processes by separate ECUs, such need being unique to control systems.

Patent Document 1: Japanese Laid-open Patent Publication No. 2006-228192

Patent Document 2: Japanese Laid-open Patent Publication No. 2005-071280

SUMMARY OF THE INVENTION

In one aspect of the present invention, a vehicle electronic control system include a first electronic control unit configured to execute a control process A; and a second electronic control unit connected to the first electronic control unit and configured to execute a control process B inseparable from the control process A. The first electronic control unit includes a synchronization signal transmit unit configured to transmit a synchronization signal to the second electronic control unit; and a first control process execution unit configured to start execution of the control process A after transmission of the synchronization signal. The second electronic control unit includes a synchronization signal receive unit configured to receive the synchronization signal from the first electronic control unit; a first time measuring unit configured to measure a predetermined time Tb since reception of the synchronization signal; and a second control process execution unit configured to start execution of the control process B when the predetermined time Tb elapses. The predetermined time Tb measured by the first time measuring unit corresponds to a time between the start of execution of the control process A and the start of execution of the control process B by a single electronic control unit in a control process in which the control process A and the control process B are controlled by the single electronic control unit.

In another aspect, a vehicle electronic control unit is connected to a second vehicle electronic control unit including a synchronization signal transmit unit configured to transmit a synchronization signal to the vehicle electronic control unit; and a first control process execution unit configured to start execution of a control process A after transmission of the synchronization signal. The vehicle electronic control unit includes a synchronization signal receive unit configured to receive the synchronization signal from the second vehicle electronic control unit; a first time measuring unit configured to measure a predetermined time Tb since reception of the synchronization signal; and a second control process execution unit configured to start execution of a control process B inseparable from the control process A when the predetermined time Tb elapses. The predetermined time Tb measured by the first time measuring unit corresponds to a time between the start of execution of the control process A and the start of execution of the control process B by a single electronic control unit in a control process in which the control process A and the control process B are controlled by the single electronic control unit.

In another aspect, a vehicle electronic control unit is connected to a second vehicle electronic control unit including a synchronization signal receive unit configured to receive a synchronization signal from the vehicle electronic control unit; a first time measuring unit configured to measure a predetermined time Tb since reception of the synchronization signal; and a second control process execution unit configured to start execution of a control process B inseparable from a control process A when the predetermined time Tb elapses. The predetermined time Tb measured by the first time measuring unit corresponds to a time between the start of execution of the control process A and the start of execution of the control process B by a single electronic control unit in a control process in which the control process A and the control process B are controlled by the single electronic control unit. The vehicle electronic control unit includes a synchronization signal transmit unit configured to transmit the synchronization signal to the second electronic control unit; and a first control process execution unit configured to start execution of the control process A after transmission of the synchronization signal.

In another aspect, a vehicle control synchronization method for a vehicle electronic control system in which a first vehicle electronic control unit configured to execute a control process A is connected to a second vehicle electronic control unit configured to execute a control process B inseparable from the control process A includes steps performed in the first vehicle electronic control unit of a synchronization signal transmit unit transmitting a synchronization signal to the second electronic control unit; and after transmission of the synchronization signal, a first control process execution unit starting execution of the control process A. The method further includes steps performed in the second vehicle electronic control unit of a synchronization signal receive unit receiving the synchronization signal from the first electronic control unit; a second time measuring unit measuring a predetermined time Tb since reception of the synchronization signal; and a second control process execution unit starting execution of the control process B when the predetermined time Tb elapses. The predetermined time Tb measured by the second time measuring unit corresponds to a time between the start of execution of the control process A and the start of execution of the control process B by a single electronic control unit in a control process in which the control process A and the control process B are controlled by the single electronic control unit.

BRIEF DESCRIPTION OF THE DRAWINGS

FIG. 10B illustrates an example of a procedure of the electronic control system executing two processes in a synchronized manner (Embodiment 3); and FIG. 11 illustrates another example of the procedure of the electronic control system executing two processes in a synchronized manner (Embodiment 3).

DETAILED DESCRIPTION OF THE PREFERRED EMBODIMENTS

Embodiments of the present invention are described with reference to the attached drawings.

Embodiment 1

Figure 1A:
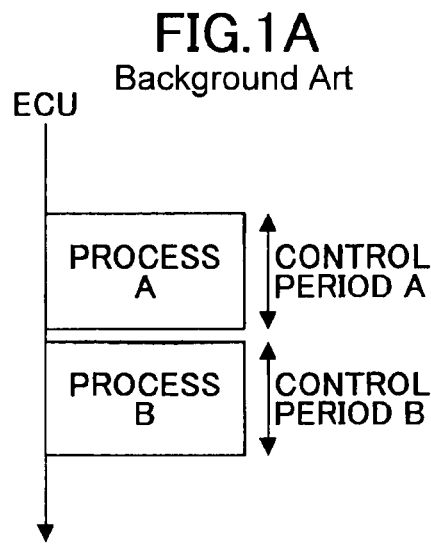
FIG. 1A illustrates an example of synchronization of two processes according to the related art.
Figure 1B:
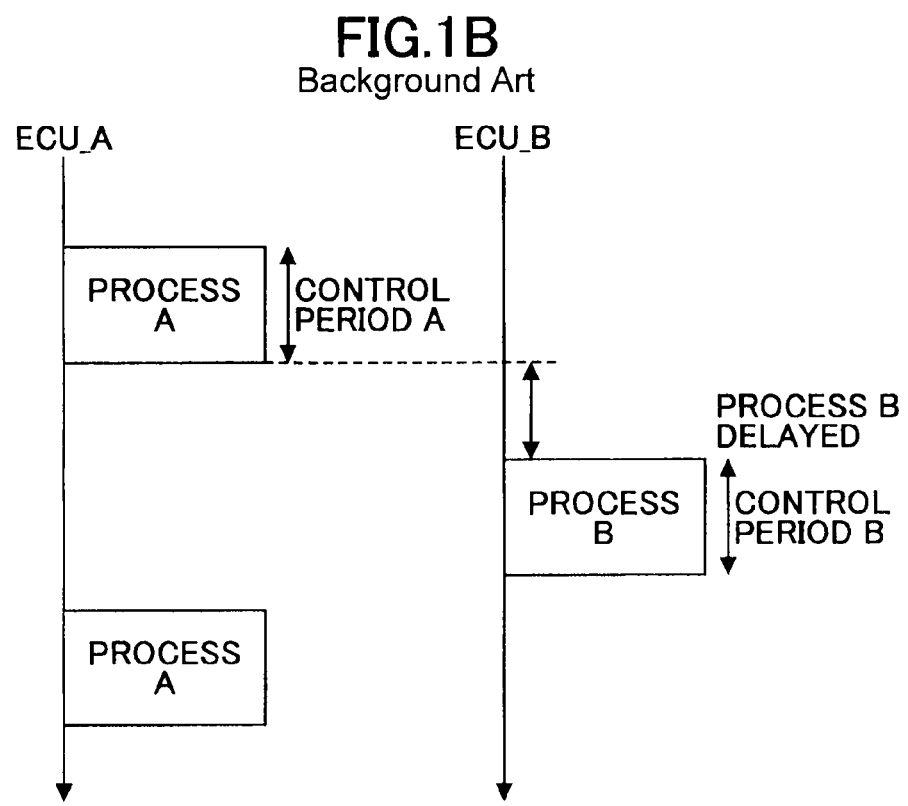
FIG. 1B illustrates a delay in one of two processes according to the related art.
Figure 1C:
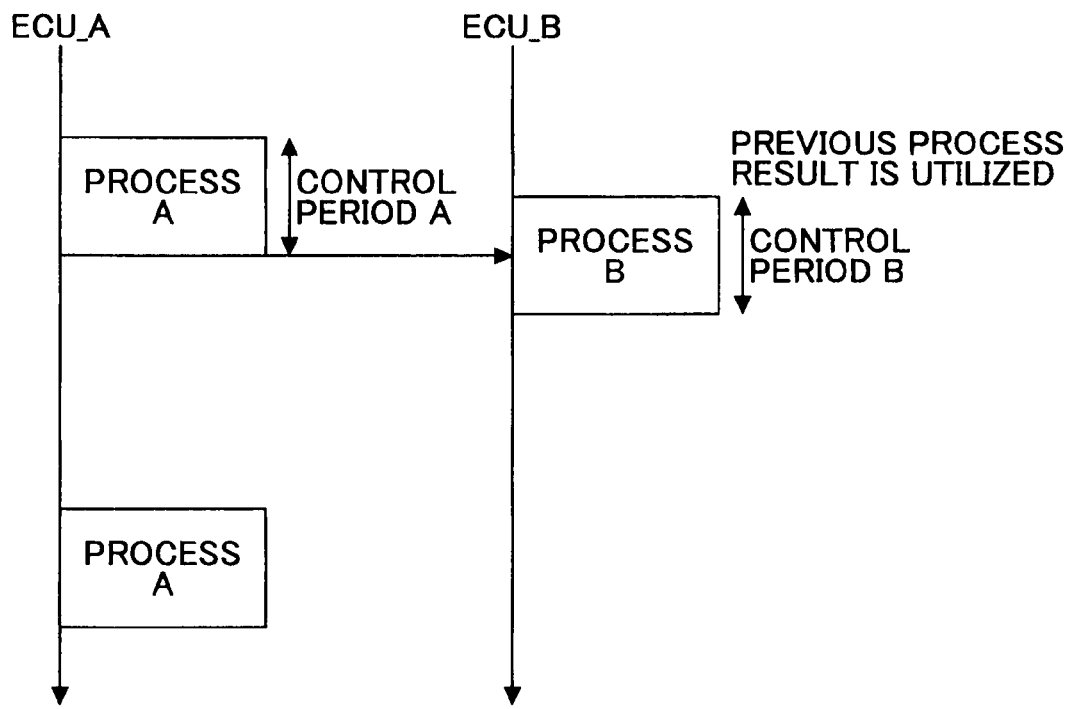
FIG. 1C illustrates a relationship of two processes in which the execution of one process is started too early according to the related art.
Figure 2A:
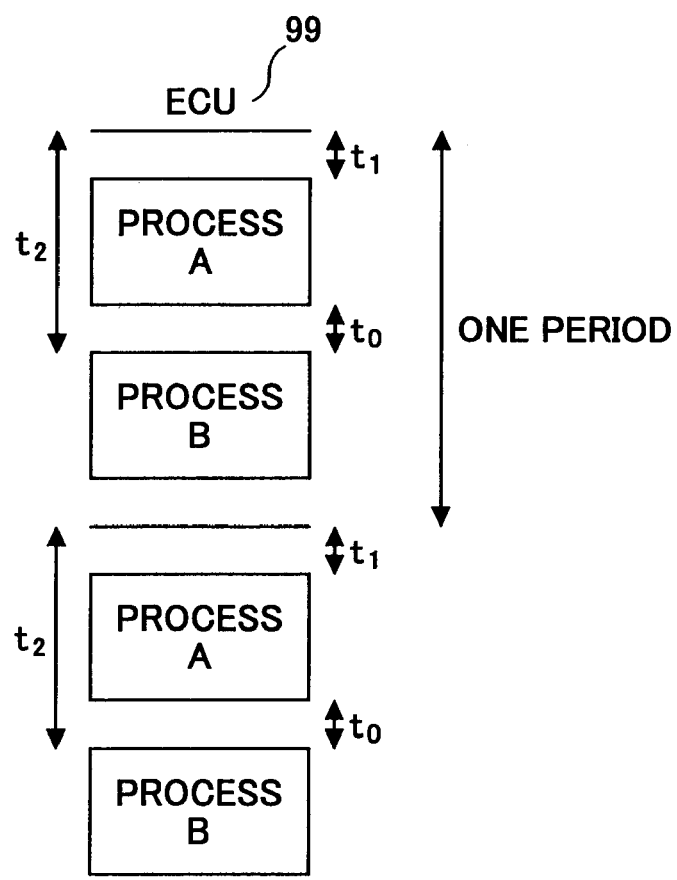
FIG. 2A illustrates an operating procedure of a single electronic control unit executing processes A and B for comparison.
Figure 2B:
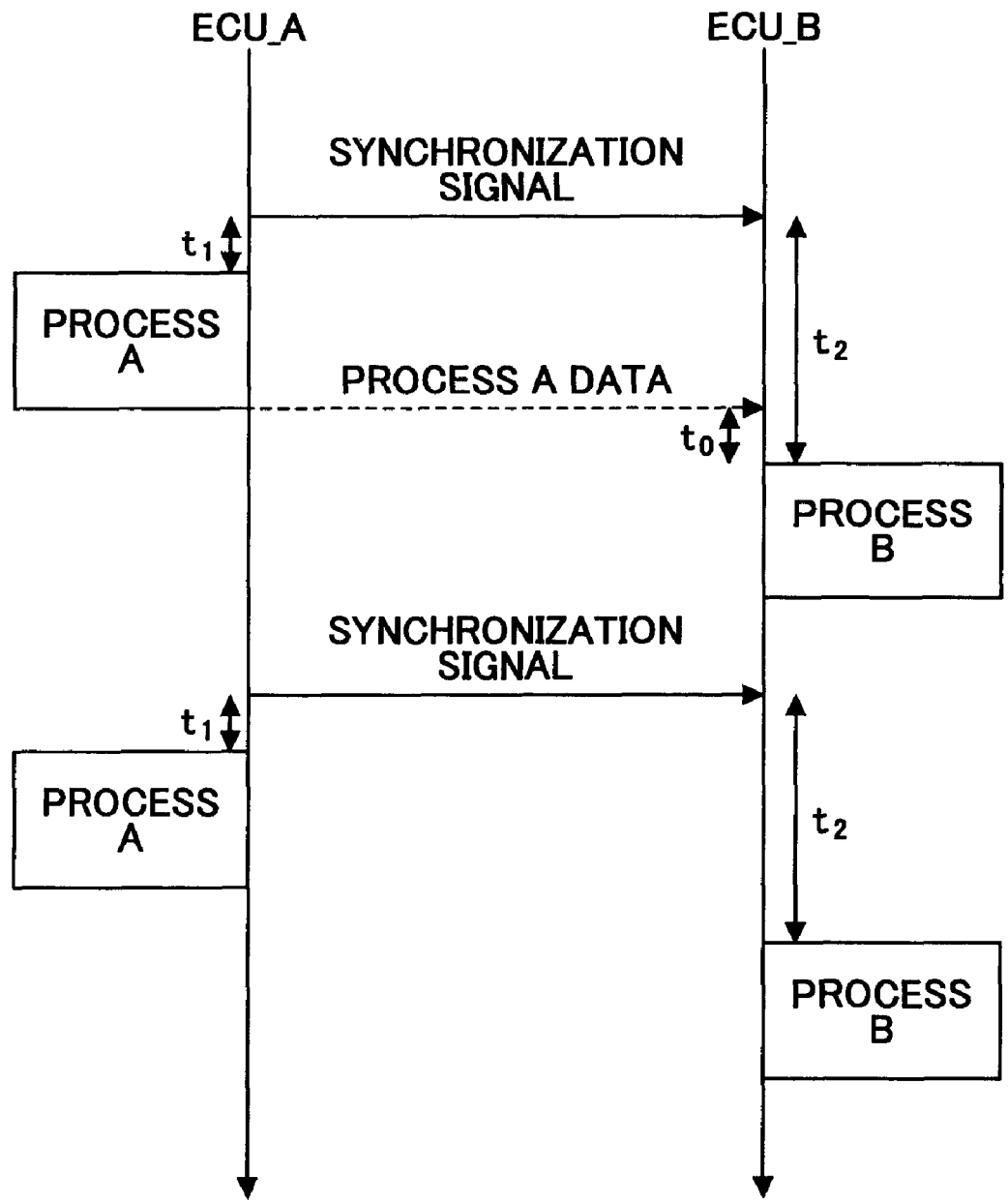
FIG. 2B illustrates an operating procedure of an electronic control system executing two processes in a synchronized manner.

With reference to FIGS. 2A and 2B, a description is given of a procedure in which an electronic control system 100 executes two processes in a synchronized manner. FIG. 2A illustrates a sequence in which a single electronic control unit (ECU) 99 executes processes A and B for comparison purposes. The process A and the process B are closely related to each other. The ECU 99 repeats the execution of the process A and the process B constituting a period. In order to appropriately control control targets, such as actuators, the process B is started within a time of $t_0$ after completion of the process A.

FIG. 2B illustrates a sequence in which the process A and the process B, which are executed by the single ECU 99 in the example of FIG. 2A, are executed by an ECU_A and an ECU_B, respectively. Each of the ECU_A and ECU_B may be simply referred to as an "ECU 50". The ECU_A transmits a synchronization signal to the ECU_B. The ECU_A then starts to execute the process A after a predetermined standby time $t_1$ from the time of transmission of the synchronization signal. The ECU_B starts executing the process B after a predetermined standby time $t_2$ from the time of reception of the synchronization signal.

As illustrated, the times $t_1$ and $t_2$ have a relationship such that $t_2 > t_1$, $t_2 - t_1 = t_0$. The times $t_1$ and $t_2$ are set such that the execution of the process B is started after the time $t_0$ from the time of completion the process A. The time $t_1$ may be a relatively short time for transmitting a synchronization signal. Preferably, the time $t_1$ may be zero. The time $t_2$ may be a total time of the time $t_1$, the execution time of the process A, and a time for acquiring a process result (which may be referred to as "process A data") of the process A.

Thus, the same sequence (order and timing) can be realized by the two ECUs, i.e., the ECU_A and the ECU_B, as when the processes A and B are executed by the single ECU 99 while the order of execution of the processes A and B is maintained. Because the response characteristics of the system of the process A and the process B as a whole remain unchanged, there is no need to review the process contents (such as parameter values) of the processes A and B even when the processes are divided for the ECU_A and the ECU_B. As a result, development efficiency can be improved.

Figure 3:
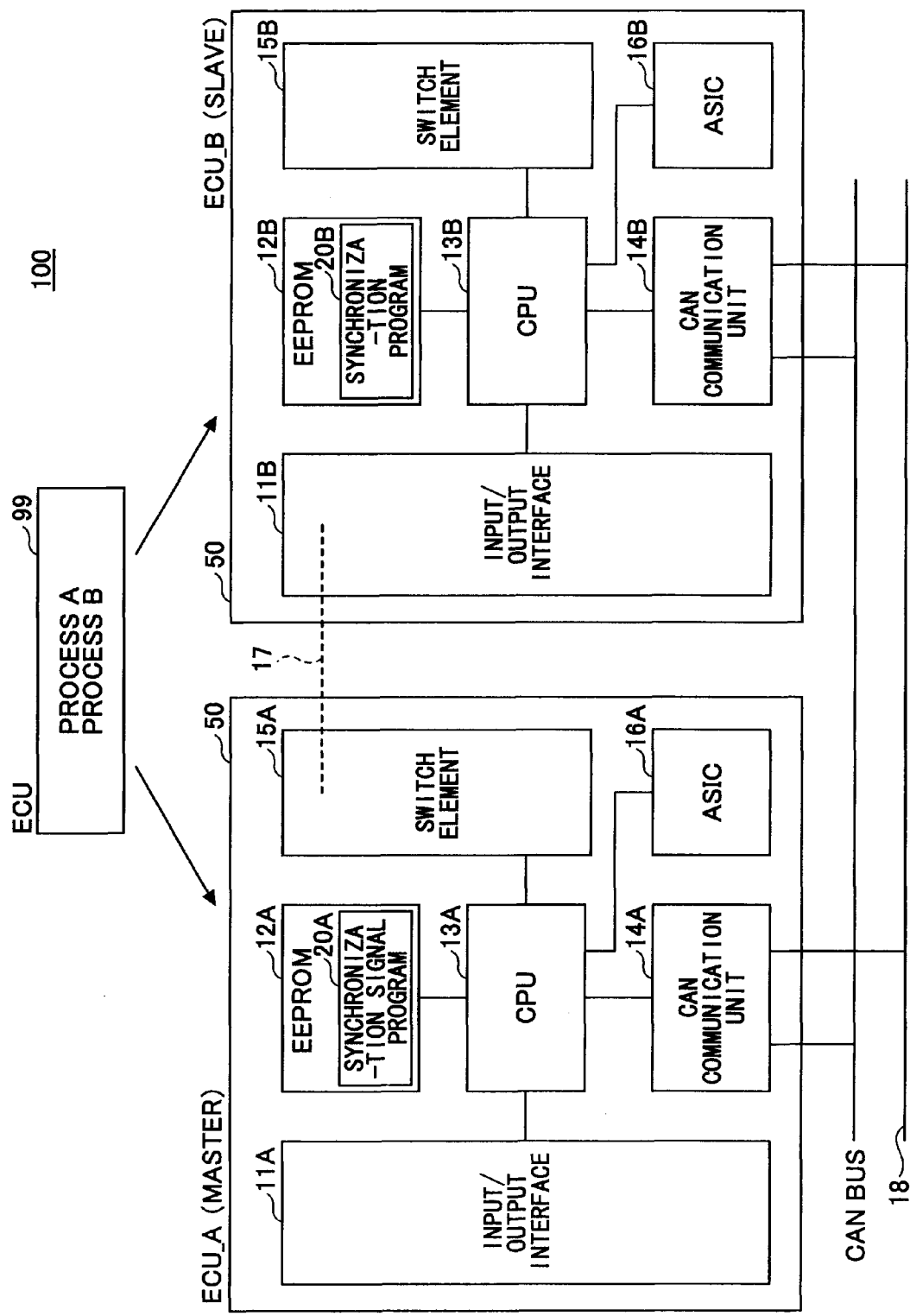
FIG. 3 is a block diagram of an electronic control system in which plural ECU's are connected.

FIG. 3 illustrates the electronic control system 100 in which plural ECUs are connected. The ECU 99 is the ECU for executing the processes A and B by itself. The process A is allocated to the ECU_A, and the process B is allocated to the ECU_B. In the example of FIG. 3, the ECU_A and the ECU_B have the same structures. Preferably, the ECU_A and the ECU_B may have different structures. Namely, when functions are allocated to plural (two in the illustrated example) ECUs, such as the ECU_A and the ECU_B, from the ECU 99, the processing capacity of hardware can be appropriately designed in view of the processing loads of the processes A and B. In FIG. 3, the ECU_A that transmits the synchronization signal is designated as a "master" while the ECU_B that receives the synchronization signal is designated as a "slave". However, this is for convenience's sake; preferably, the ECU_B may transmit the synchronization signal to the ECU_A or another ECU.

In the illustrated example of FIG. 3, the ECU 99 includes an engine ECU, for example. The engine ECU includes a power supply control function and an engine control function. Because the power supply control function is increasingly being diversified, the functions that used to be executed by the single ECU 99 are divided so that the processing load can be distributed. Specifically, the power supply control function is allocated to the ECU_A while the engine control function is allocated to the ECU_B. The power supply control function may activate a starter motor upon ignition in order to increase the engine rotation speed, and turn on a switch between a fuel pump and a battery in order to activate the fuel pump and enable the supply of fuel to the engine. The engine control function may control the timing of fuel injection into the engine with an increased rotation speed so that the engine can idle.

Preferably, the power supply control function may calculate a SOC (State of Charge) of the battery based on a voltage and a current of the battery. When it is determined that the battery is not sufficiently charged based on the SOC, the power supply control function may control an alternator adjusting voltage, while the engine control function may increase the engine rotation speed during idling in order to increase the charging rate. Thus, the power supply control function and the engine control function are closely related to each other.

In recent years, hybrid vehicles and electric vehicles have become commercially available. In such vehicles, an electric motor and the engine may be controlled in a closely related manner, or plural in-wheel motors may be controlled in a closely related manner. In the case of a hybrid vehicle, the ECU 50 may include a hybrid ECU. The hybrid ECU may calculate a required torque to be outputted to an input shaft based on the amount of operation of the accelerator pedal by an operator and the vehicle speed, and then calculate control amounts for the engine and the motor such that the required torque can be obtained (process A). The engine ECU may calculate a rotation speed based on one of the control amounts and control the engine (process B). The motor ECU may calculate a current value of a current that flows through the motor based on the other control amount (torque command), or perform switching of an inverter in accordance with a PWM signal of a duty ratio determined depending on the current value (process C).

Thus, in this case, the processes A through C are executed by the three ECUs 50, i.e., the hybrid ECU, the engine ECU, and the motor ECU, in a closely coordinated manner in order to operate the vehicle. In accordance with the present embodiment, the processes A through C can be synchronized among the three ECUs 50 by a synchronization signal. In the example of the hybrid vehicle, the functions (processes A through C) are not integrated. Preferably, the processes executed by the three ECUs 50 may be integrated for two ECUs 50. For example, the process A and the process B may be integrated for the ECU_A while the process C may be integrated for the ECU_B, so that the processes can be synchronized between the two ECUs 50 in accordance with the synchronization signal of the present embodiment. Thus, the synchronization signal according to the present embodiment may be applied to the case where ECUs 50 are integrated in addition to the case where the processes of the single ECU 99 are separated for plural ECUs 50.

Further, the engine and the transmission may have closely related processes. Two such processes that used to be executed by a power train ECU according to the related art may be separated for the ECU_A and the ECU_B and synchronized by a synchronization signal according to an embodiment of the present invention.

Thus, in the electronic control system 100 according to the present embodiment, the processes A and B that are closely or inseparably related to each other are executed by separate ECUs 50. By "closely" or "inseparably", it is meant that, for example, the process B is required after the process A, and that the timing of starting the execution of the process B is restricted by the time at which the process A data of the process A is obtained.

As illustrated in FIG. 3, a CPU 13A of the ECU_A is connected to an input/output interface 11A, an EEPROM 12A, a switch element 15A, an ASIC (Application Specific Integrated Circuit) 16A, and a CAN communication unit 14A via buses. A CPU 13B of the ECU_B is connected to an input/output interface 11B, an EEPROM 12B, a switch element 15B, an ASIC 16B, and a CAN communication unit 14B via buses. Because the ECU_A and the ECU_B may have the same structures, a description is given of the ECU_A in the following.

The EEPROM 12A stores a process A program (not illustrated) for the process A, data (including the standby time $t_1$ between the transmission of the synchronization signal and the start of execution of the process A) for the process A, and a synchronization signal program 20A for transmitting a synchronization signal. The ECU_A may execute a process other than the process A which is not closely related to the process B. Thus, the EEPROM 12A may also store a program (not illustrated) other than the process A program. Preferably, the process A program and the synchronization signal program 20A may be separate. Preferably, the process A may be executed by a single main function and the synchronization signal program 20A may be located within the main function.

The EEPROM 12B stores a process B program (not illustrated) for the process B, data (including the standby time $t_2$ between the reception of the synchronization signal and the start of execution of the process B) required by the process B, and a synchronization program 20B for receiving the synchronization signal and measuring the time $t_2$. The ECU_B may execute a process other than the process B which is not closely related to the process A. Thus, the EEPROM 12B may also store a program (not illustrated) other than the process B program.

The input/output interface 11A is connected to various sensors. When the ECU 50 is an engine ECU, the sensors may include an $O_2$ sensor, a water-temperature sensor, and a crank position sensor. The switch element 15A may include a MOSFET or an IGBT (Insulated Gate Bipolar Transistor) as actual entities. Various switches, actuators, or solenoids may be connected to the switch element 15A. The ASIC 16A may be connected to motors and actuators implemented in accordance with specific operation or control requirements. The CAN communication unit 14A of the ECU_A is connected to the CAN communication unit 14B of the ECU_B via a CAN bus 18, so the plural ECUs 50 can communicate with each other by a time-division multiplex technology. The communication between the ECUs 50 may be realized by using a communication method other than the CAN, such as FlexRay. Preferably, the ECU_A and the ECU_B may be connected to each other via a direct connecting line 17. The relationship between the CAN communication units 14A and 14B and the direct connecting line 17 is described later.

Figure 4:
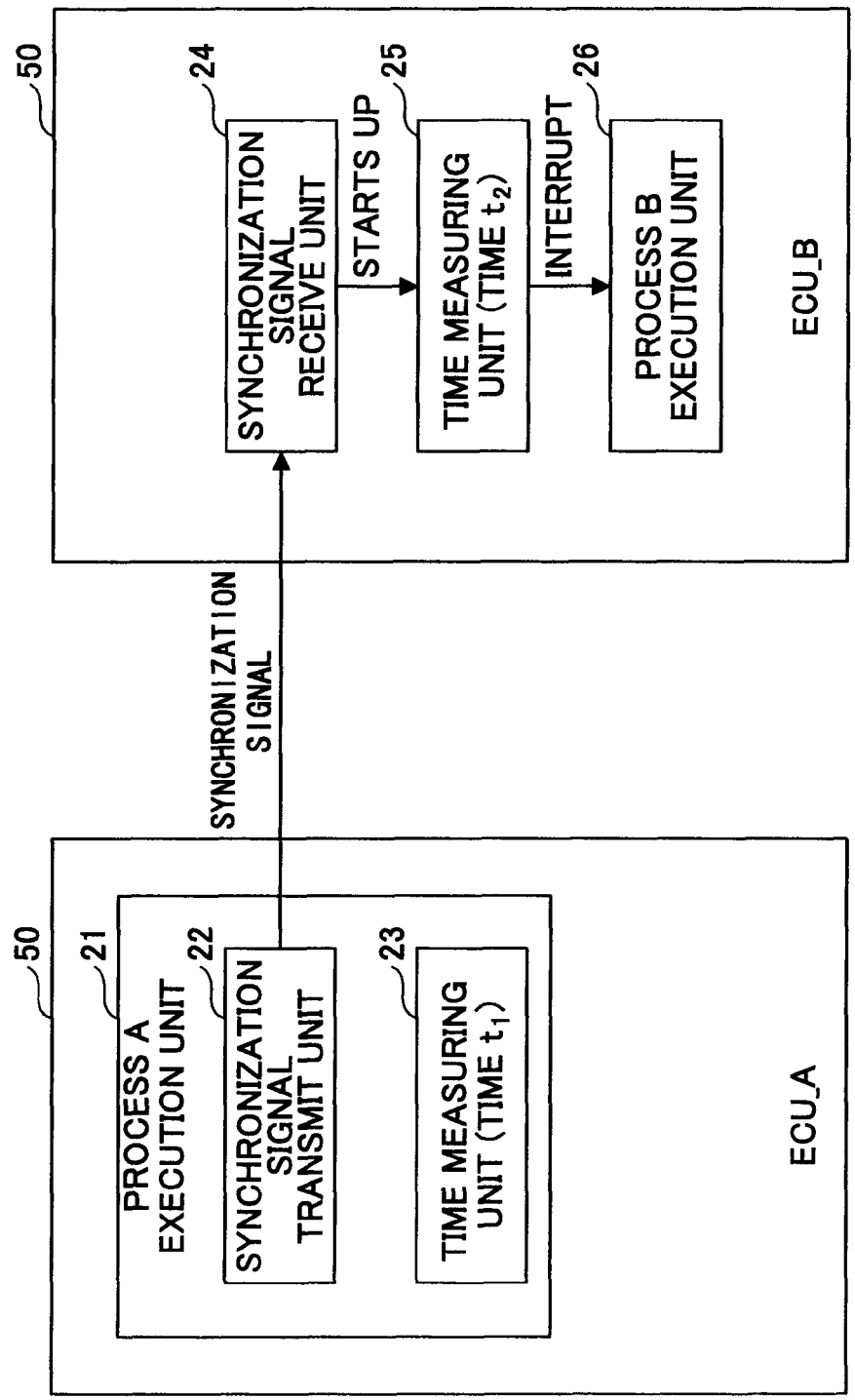
FIG. 4 is a functional block diagram of an ECU_A and an ECU_B.

FIG. 4 is a functional block diagram of the ECU_A and the ECU_B according to the present embodiment. The CPU 13A may include one or more CPU cores that execute the process A program and the synchronization signal program 20A stored in the EEPROM 12A. A process A execution unit 21 for executing the process A may be realized by the CPU 13A of the ECU_A executing the process A program and the synchronization signal program 20A, or by a logic circuit such as the ASIC 16A. Similarly, a synchronization signal receive unit 24 for receiving the synchronization signal, a time measuring unit 25 for measuring the time $t_2$, and a process B execution unit 26 for executing the process B may be realized by the CPU 13B of the ECU_B executing the process B program and the synchronization program 20B, or by a logic circuit such as the ASIC 16B.

(Execution of Process A)

The process A execution unit 21 further includes a synchronization signal transmit unit 22 for transmitting a synchronization signal and a time measuring unit 23 for measuring the time $t_1$. The process A execution unit 21 notifies the time measuring unit 23 upon transmission of the synchronization signal from the synchronization signal transmit unit 22. In response, the time measuring unit 23 starts measuring the time The time measuring unit 23 notifies the process A execution unit 21 upon measuring the elapse of the time $t_1$. In response, the process A execution unit 21 starts executing the process A. Because the execution time for the process A by the CPU 13A is substantially constant, the execution of the process A can be completed by allocating a time slice longer than the execution time. When the time $t_1$ is zero, the time measuring unit 23 may be omitted.

The process A is executed as a hard real-time process so that the process A can be completed within the time $t_2$ after the transmission of the synchronization signal. A high priority may be set for the process A so that an OS scheduler can ensure completion of the hard real-time process by executing the process A with priority or by preventing an interrupt from another process. The process B is also a hard real-time process.

The process A may be started either when an interrupt is detected by the CPU 13A, at cycle time intervals, or at a predetermined timing (such as upon completion of the process B). The process A execution unit 21 transmits the process A data of the process A to the ECU_B upon completion of the process A. Preferably, the process A execution unit 21 may not be required to transmit the process A data. The ECU_A may transmit the process A data to the CAN communication unit 14B of the ECU_B from the CAN communication unit 14A.

(Transmission of Synchronizing Signal)

As described above, the synchronization signal transmit unit 22 transmits the synchronization signal before execution of the process A is started. For example, the synchronization signal transmit unit 22 implemented as a subroutine is called from a main function of the process A, and then the synchronization signal transmit unit 22 transmits the synchronization signal. The synchronization signal transmit unit 22 notifies the main function about the transmission of the synchronization signal. Thus, the main function of the process A calls the time measuring unit 23 implemented as a subroutine, and then the time measuring unit 23 starts measuring the time $t_1$. The time measuring unit 23 monitors the time since the start of measuring time by utilizing the clock function of the CPU 13A, and keeps measuring the time until the time $t_1$ has elapsed.

Preferably, the synchronization signal may be transmitted by a process other than the process A. In this case, the synchronization signal transmit unit 22 may transmit the synchronization signal when the same condition as the condition (such as an interrupt) for the CPU 13A to start executing the process A is satisfied. After the synchronization signal is transmitted, the synchronization signal transmit unit 22 may call the time measuring unit 23, and the time measuring unit 23 may start the timer by setting the time $t_1$ in the timer. The timer issues an interrupt to the CPU 13A upon elapsing of the time $t_1$. Thus, an interrupt handler causes the CPU 13A to execute the process A, so that the process A execution unit 21 can start executing the process A after the time $t_1$ (start timing) from the time of transmission of the synchronization signal. Thus, in accordance with this embodiment, the time $t_1$ can be measured by a hardware timer in the CPU 13A. The interrupt mechanism by an interrupt handler is well-known in the related art and therefore not described in the following.

When a process other than the process A transmits the synchronization signal, the CPU 13A can execute a process other than the process A until the time $t_1$ elapses, so that the process efficiency of the ECU_A can be increased. However, overhead may be caused for an interrupt process. When the synchronization signal is transmitted within the process A, the CPU 13A is in standby status while the time $t_1$ is measured by the time measuring unit 23. However, because the time $t_1$ is relatively short and may even be zero, not much decrease in process efficiency is caused. Thus, the synchronization signal may be transmitted by either the process A or another process, depending on the performance or features of the CPU 13A.

(Synchronization Signal)

The synchronization signal is transmitted via the CAN communication or the direct connecting line 17. The direct connecting line 17 may include wire harnessing connecting a terminal of the ECU_A (such as the switch element 15A in FIG. 3) and a terminal of the ECU_B (such as the input/output interface 11B in FIG. 3). The direct connecting line 17 may less likely cause transmission error, such as the synchronization signal failing to reach the ECU_B, because the direct connecting line 17 is used only by the ECU_A and the ECU_B. However, the need for installing the direct connecting line 17 on a vehicle may result in an increase in cost or weight of the vehicle.

On the other hand, such cost increases may be prevented by transmitting the synchronization signal via the CAN communication because each ECU 50 includes the CAN communication units 14A and 14B. However, because the CAN communication is based on the CSMA/CA (Carrier Sense Multiple Access/Collision Avoidance) accessing procedure, the ECU_A may not be able to transmit the synchronization signal at a desired timing if the CAN bus 18 is being used by another ECU 50 including the ECU_B.

Thus, when it may be estimated that the utilization rate of the CAN bus 18 to which the ECU_A and the ECU_B are connected is sufficiently small, the system may be designed such that the synchronization signal is transmitted by the CAN communication without implementing the direct connecting line 17. When the utilization rate of the CAN bus 18 is relatively large, the system may be designed such that the synchronization signal is transmitted by implementing the direct connecting line 17. Thus, various implementations may be adopted in different vehicles or depending on the design policy, including an implementation in which both the CAN communication and the direct connecting line 17 are implemented.

The synchronization signal transmitted by the direct connecting line 17 may include a High (such as 5 V) signal. The synchronization signal transmit unit 22 may transmit the High signal by turning on one of the switches connected to the switch element 15A. The synchronization signal receive unit 24 receives an I/O interrupt that is issued upon detection of a rising edge from Low to High by the input/output interface 11B of the ECU_B as the synchronization signal.

The synchronization signal may be transmitted by the CAN communication using the following CAN frame as a unit of transmission.

[SOF; data ID field; RTR; DLC; data field; CRC field; ACK field; EOF]

In the data ID field, a data ID identifying the communication data is stored. In the data ID, a value indicating the storage of the synchronization signal may be set. A data field may normally store transmission target data. In accordance with the present embodiment, however, no data need be stored in the data field as long as the ECU_A can notify the ECU_B of the synchronizing timing. When the ECU_A transmits plural different synchronization signals, synchronization signal identifying data may be stored in the data field. Because the CAN frame for transmitting the synchronization signal has fixed values in the respective fields, the CAN frame may be stored in the synchronization signal program 20A as fixed data.

The CAN communication unit 14B of the ECU_B refers to the data ID of the CAN frame that is broadcast via the CAN bus 18, and receives the CAN frame if the data ID indicates that the ECU_B should receive the CAN frame. The synchronization signal receive unit 24 receives a reception interrupt requested by the CAN communication unit 14B as the synchronization signal.

(Execution of Process B)

Execution of the process B is started when the time $t_2$ elapses from the time of reception of the synchronization signal by the ECU_B. The synchronization signal receive unit 24 receives the synchronization signal via the direct connecting line 17 or the CAN communication. The time $t_2$ may be the same as the time between the start of execution of the process A and the start of execution of the process B by the ECU 99 in the case where the processes A and B are executed by the single ECU 99.

Thus, the synchronization signal receive unit 24 receives the synchronization signal upon issuance of the I/O interrupt from the input/output interface 11B to the CPU 13B. The synchronization signal receive unit 24 also receives the synchronization signal upon issuance of a reception interrupt from the CAN communication unit 14B to the CPU 13B. In the following, the I/O interrupt and the reception interrupt may be both referred to simply as a "synchronization signal interrupt".

In the execution of the process B, the passage of the time $t_2$ may be measured within the process B or by a process separate from the process B. The time $t_2$ includes the time between the reception of the synchronization signal and the end of the process A and is therefore relatively long. Thus, it is preferable for the CPU 13B to be able to perform a process while standing by for the passage of the time $t_2$. Thus, the time $t_2$ is measured by the time measuring unit 25 independently of the process B. Upon reception of the synchronization signal, the synchronization signal receive unit 24 causes the CPU 13B to start up the time measuring unit 25. The time measuring unit 25 may start a timer by setting the time $t_2$ in the timer. At this point, the time measuring unit 25 may stop. Upon passage of the time $t_2$, the timer issues an interrupt to the CPU 13B and the CPU 13B executes the process B. Thus, the process B execution unit 26 can start executing the process B from the time of elapsing of the time $t_2$ since the transmission of the synchronization signal as the start timing. In this way, the ECU_B can execute a process not related to the process A during the time $t_2$.

Preferably, the time measuring unit 25 implemented as a subroutine may be called from the main function of the process B, and the time $t_2$ may be measured by the time measuring unit 25.

Thus, the process B execution unit 26 starts executing the process B upon passage of the time $t_2$. The time for execution of the process B by the CPU 13B is substantially constant. Thus, the execution of the process B can be completed by allocating a time slice longer than the substantially constant execution time. While FIGS. 2A and 2B illustrate the processes A and B having substantially the same execution time, the execution times for the processes A and B may be different.

The process B execution unit 26 transmits the process B data, i.e., the process result of the process B, to the ECU_A upon completion of the process B. However, this is for the case where the ECU_A utilizes the process B data for the process A or another process. Preferably, the process B data may not be transmitted.

(Operating Procedure of Electronic Control System (ECU_A, ECU_B))

Figure 5:
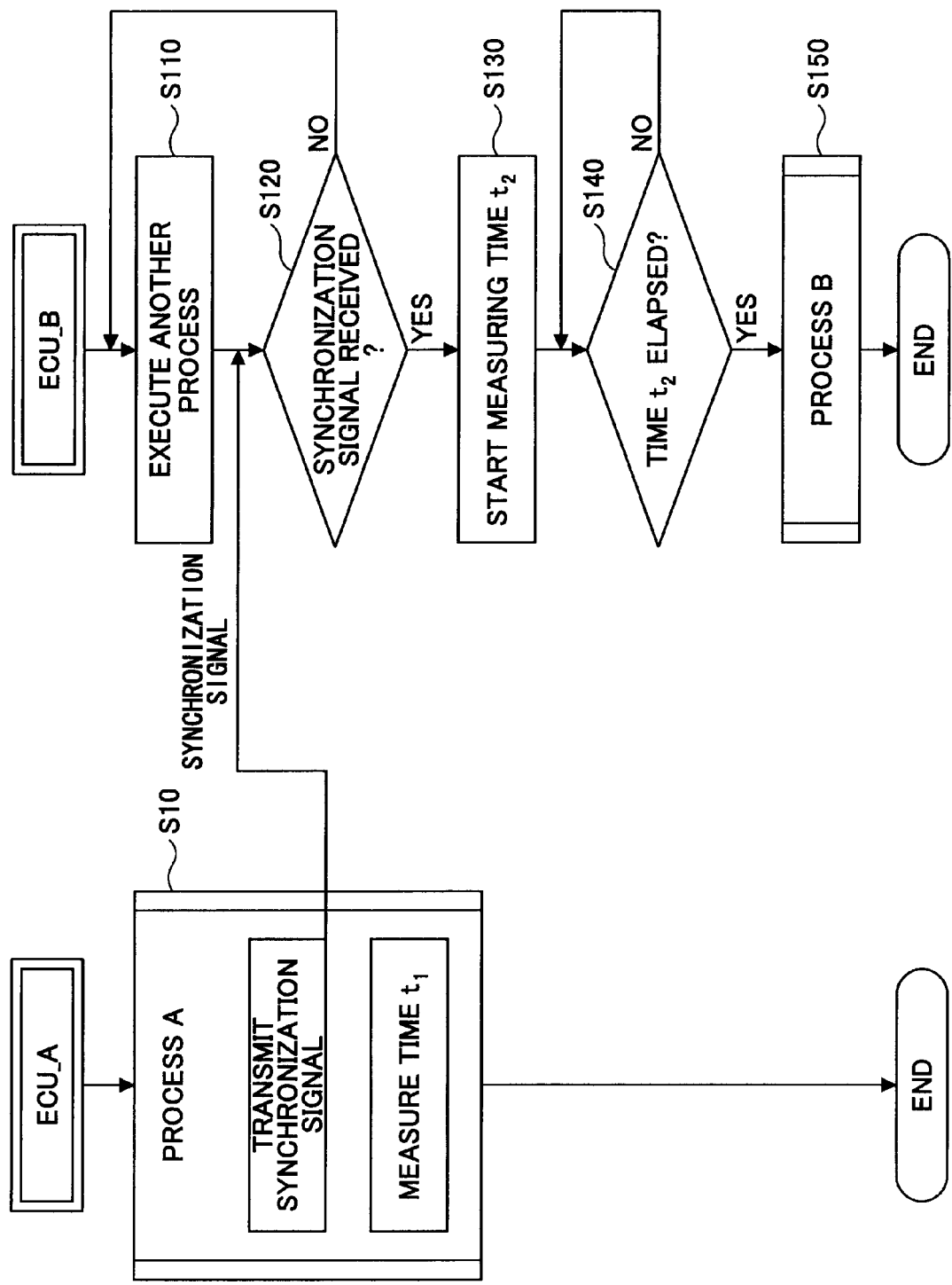
FIG. 5 is a flowchart of an operating procedure of an electronic control unit system.

FIG. 5 is a flowchart of an operating procedure of the electronic control system 100. While the ECU_A and the ECU_B execute separate processes, because the processes A and B are closely related to each other in terms of control, the operation of the flowchart of FIG. 5 is started upon starting the process A by the ECU_A, for example.

When the CPU 13A executes the process A program, the process A execution unit 21 starts to execute the process A (S10). In the process A, the synchronization signal transmit unit 22 transmits a synchronization signal to the ECU_B. The time measuring unit 23 measures the time until the time $t_1$ elapses.

When the time measured by the time measuring unit 23 is equal to or more than the time $t_1$, the process A execution unit 21 starts to execute the process A. When the time $t_1$ is zero, the time may not be measured.

On the other hand, the ECU_B executes another process or is in idle status until the ECU_B receives the synchronization signal (S110, S120). Upon transmission of the synchronization signal from the ECU_A ("Yes" in S120), the time measuring unit 25 starts to measure the time $t_2$ upon issuance of a synchronization signal interrupt due to reception of the synchronization signal by the synchronization signal receive unit (S130). The time measuring unit 25 sets the time $t_2$ in the timer, starts the timer, and stops.

Thus, the ECU_B can execute a process other than the process B until the time $t_2$ elapses, i.e., until the timer issues the interrupt to the CPU 13B ("No" in S140).

Upon passage of the time $t_2$, the process B execution unit 26 starts to execute the process B (S150). Because the process A is completed by the time the time $t_2$ elapses, the process B execution unit 26 can execute the process B by utilizing the process A data of the process A as needed.

As described above, in the electronic control system 100 according to the present embodiment, the ECU_A and the ECU_B stand by for the times $t_1$ and $t_2$, respectively, after the synchronization signal is transmitted from the ECU_A. Thus, the ECU_B can be prevented from starting the execution of the process B before the process A is completed, or starting the execution of the process B a long time after the completion of the process A. Thus, the ECU_B can execute the process B without delay with respect to the process A with which the process B is closely related. As a result, the problem of the related art that the process B fails to be executed in one control period B can be prevented. Further, because the response characteristics of the system of the processes A and B as a whole are not changed, there is no need to review the process contents (such as parameter values) of the processes A and B even when the processes are separated for the ECU_A and the ECU_B, thus successfully improving development efficiency.

Embodiment 2

In the electronic control system 100 according to Embodiment 2, the ECU_A transmits the synchronization signal and the process A data to the ECU_B upon, before, or after completion of the process A.

Figure 6A:
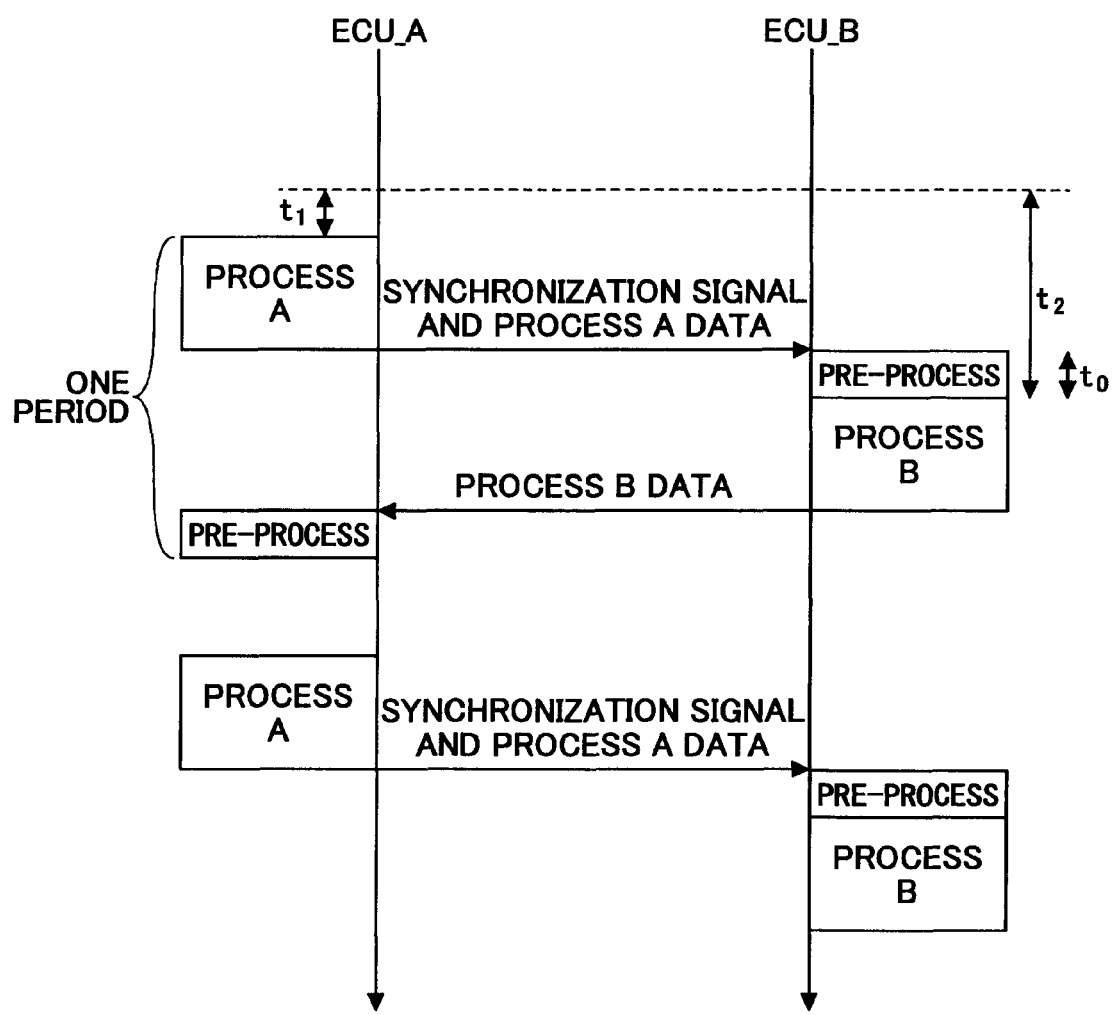
FIG. 6A illustrates an example of an operation of an electronic control system executing two processes in a synchronized manner (Embodiment 2)

FIG. 6A illustrates an example of synchronization of two processes. The ECU_A transmits the synchronization signal and the process A data to the ECU_B upon, before, or after completion of the process A. The ECU_B executes the process B at the time of issuance of a synchronization signal interrupt caused by the reception of the synchronization signal as a start timing.

The ECU_A may transmit the synchronization signal and the process A data to the ECU_B before the elapse of the time $t_2$ of Embodiment 1 and preferably upon elapse of the time "$t_2-t_0$". Thus, the response characteristics of the system can remain the same as when the processes A and B are executed by the single ECU 99. Further, the same sequence can be realized with the ECU_A and the ECU_B as when the processes A and B are executed by the single ECU 99 while the order of execution of the processes A and B is maintained. Thus, the ECU_B can execute the process B by utilizing the process A data of the process A.

The ECU_B transmits the process B data to the ECU_A when the process B data is obtained by the process B. The period between the start of execution of the process A by the ECU_A and the reception of the process B data constitutes one period. The ECU_A completes a pre-process before the next process A.

A "pre-process" of the ECU_B may refer to a process related to the synchronization signal interrupt, a communication process of the CAN communication unit 14B, or an expanding process of the process A data. Similarly, a "pre-process" of the ECU_A may refer to a process related to the reception interrupt, a communication process of the CAN communication unit 14A, or an expanding process of the process B data.

Figure 6B:
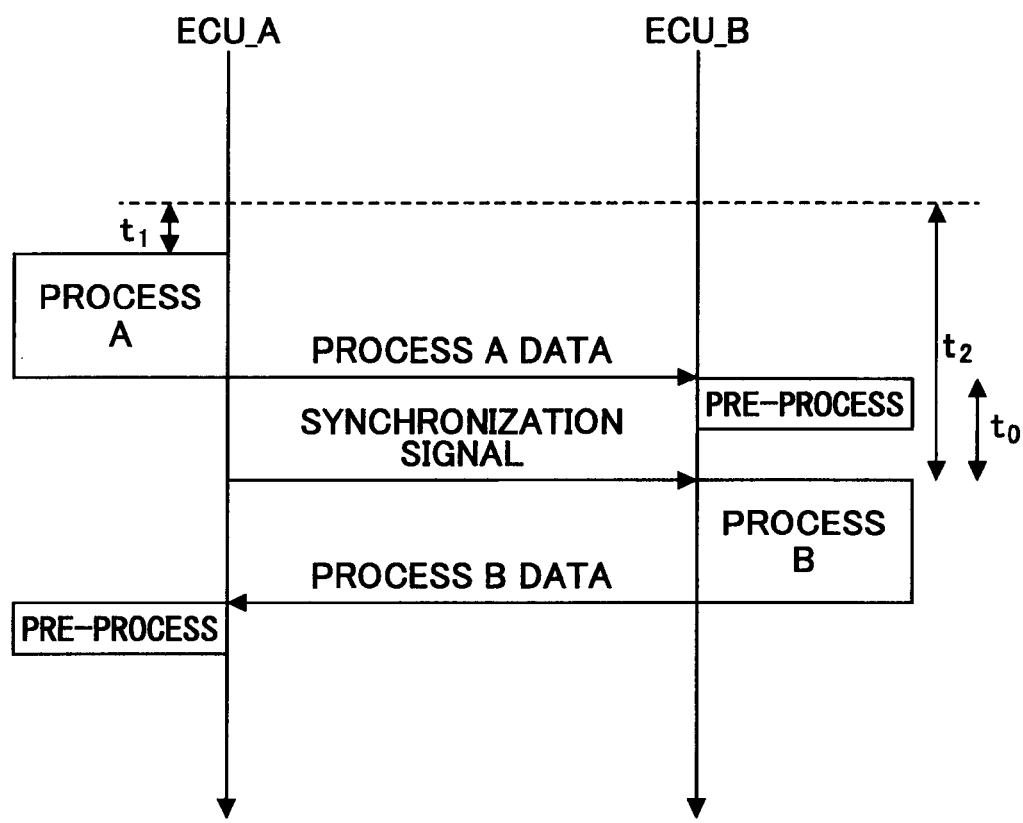
FIG. 6B illustrates another example of an operation of the electronic control system executing two processes in a synchronized manner (Embodiment 2)

FIG. 6B illustrates another example of synchronization of two processes. As illustrated, the ECU_A may transmit the synchronization signal and the process A data to the ECU_B at different timings. In the illustrated example, the process A data is transmitted before the synchronization signal is transmitted. In the embodiment of FIG. 6B, the ECU_B executes the process B by using the reception of the synchronization signal as a synchronization signal interrupt. Thus, the same sequence can be realized with the ECU_A and the ECU_B as when the processes A and B are executed by the single ECU while the order of execution of the processes A and B is maintained, as described in detail below.

Figure 7:
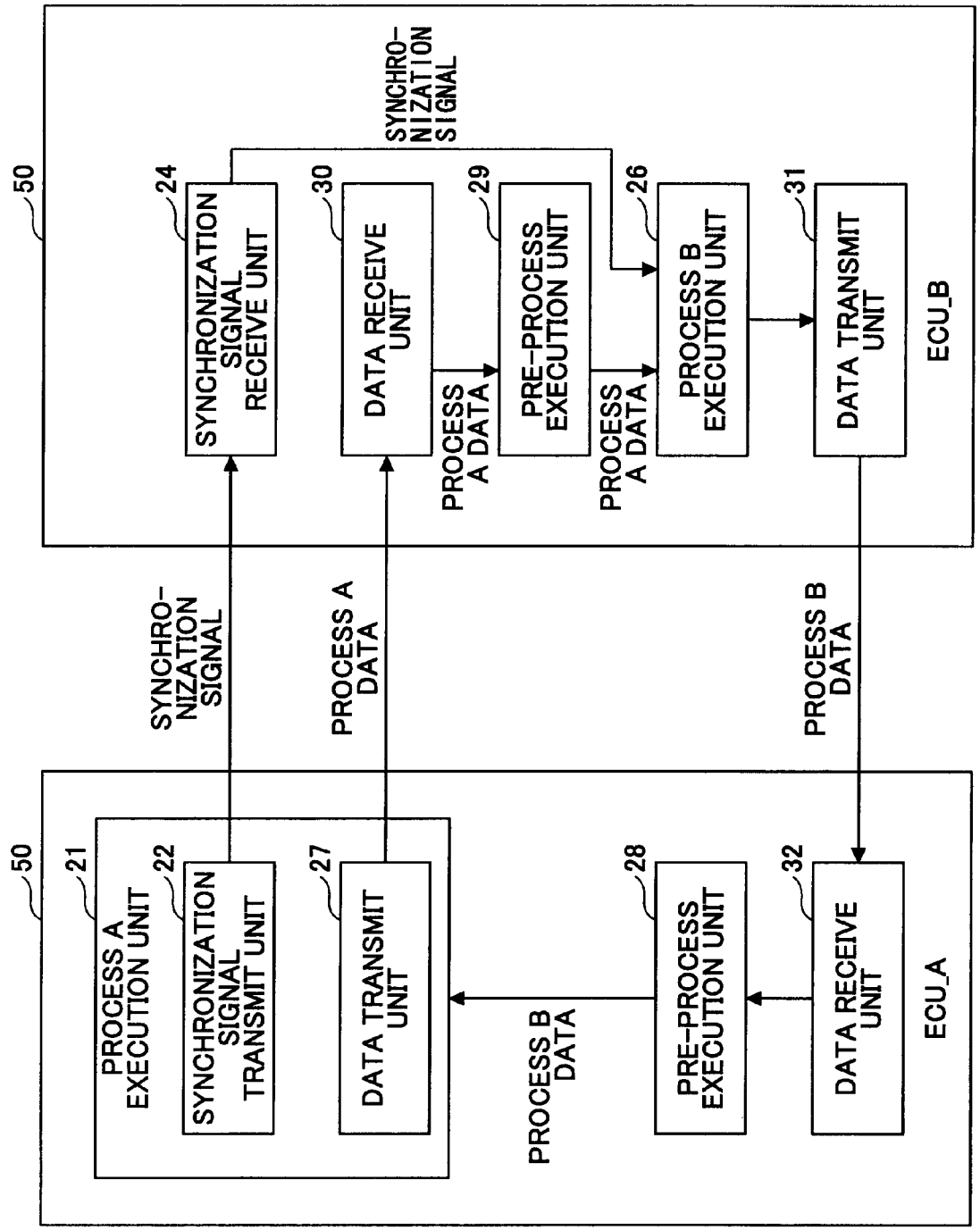
FIG. 7 is a functional block diagram of the ECU_A and the ECU_B (Embodiment 2)

FIG. 7 is a functional block diagram of the ECU_A and the ECU_B according to the present embodiment. In FIG. 7, similar parts to those of FIG. 4 are designated with similar numerals and their description is omitted. The ECU_A of the present embodiment includes a data transmit unit 27, a pre-process execution unit 28, and a data receive unit 32. The ECU_B includes a pre-process execution unit 29, a data receive unit 30, and a data transmit unit 31.

(Transmission of Synchronization Signal)

Transmission of the synchronization signal according to the present embodiment is described. The synchronization signal transmit unit 22 transmits the synchronization signal to the ECU_B either before, at, or after completion of the process A. The synchronization signal transmit unit 22 transmits the synchronization signal to the ECU_B at the same timing as the timing of starting the execution of the process B after completion of the process A by the single ECU 99. This timing corresponds to the time $t_2$ of Embodiment 1. Preferably, the transmission of the synchronization signal may be limited within the time "$t_2-t_0$" so that the start timing of the process B is not delayed. In the embodiment where the process A data is transmitted first and then the synchronization signal is transmitted, the synchronization signal is transmitted at the time $t_2$. In the embodiment where the process A data and the synchronization signal are transmitted at substantially the same timings, the process A data and the synchronization signal may be transmitted within the time "$t_2-t_0$".

In either of the transmission timings, the synchronization signal transmit unit 22 implemented as a subroutine may be called from the main function of the process A so that the synchronization signal transmit unit 22 can transmit the synchronization signal. The synchronization signal may be transmitted via the direct connecting line 17 or the CAN communication units 14A and 14B, or both.

(Transmission of Process A Data)

When the data transmit unit 27 transmits the process A data, the process A data may be transmitted at the same timing as (FIG. 6A), soon after, or asynchronously (FIG. 6B) with the transmission of the synchronization signal.

Transmission of the Process A Data at the Same Timing as the Synchronization Signal When the synchronization signal transmit unit 22 transmits the synchronization signal by the CAN communication, the data transmit unit 27 stores the process A data in the CAN frame for transmitting the synchronization signal. In this way, the data transmit unit 27 can transmit the process A data at the same timing as the synchronization signal. When the synchronization signal transmit unit 22 transmits the synchronization signal via the direct connecting line 17, the data transmit unit 27 transmits the process A data from the CAN communication unit 14A upon reception of a notice of transmission of the synchronization signal from the synchronization signal transmit unit 22. The data transmit unit 27 may transmit the process A data not exactly at the same timing but at substantially the same timing as the synchronization signal.

Transmission of the Process A Data Soon after the Transmission of the Synchronization Signal The data transmit unit 27 transmits the process A data from the CAN communication unit 14A within a predetermined time upon reception of a notice of transmission of the synchronization signal from the synchronization signal transmit unit 22. The predetermined time may be a time required for the ECU_B to produce a synchronization signal interrupt upon reception of the synchronization signal. In this way, the data transmit unit 27 can transmit the process A data soon after transmission of the synchronization signal.

Transmission of the Process A Data Asynchronously with the Synchronization Signal The data transmit unit 27 may transmit the process A data to the ECU_B immediately after the transmission of the process A data is enabled in the process A, or when a part of the process A required by the process B is completed. In this way, the ECU_B can complete the pre-process early. When the process A data is transmitted asynchronously with the synchronization signal, the process A data may be preferably transmitted within the time "$t_2-t_0$" or before the time $t_2$ of Embodiment 1 at the latest so that the process B can utilize the process A data.

(Execution of Pre-process)

The data receive unit 30, which may be realized by the CAN communication unit 14B of the ECU_B, receives the process A data (or both the synchronization signal and the process A data). Upon reception of the process A data, the CAN communication unit 14B issues an interrupt to the CPU 13B (reception interrupt). In response, the CPU 13B starts up the pre-process execution unit 29. As described above, the pre-process execution unit 29 may refer to a process related to the synchronization signal interrupt, a communication process of the CAN communication unit 14B, or an expanding process of the process A data. The pre-process execution unit 29 may store the process A data that has been pre-processed in a RAM or a nonvolatile memory.

Upon reception of the process B data, the CAN communication unit 14A of the ECU_A issues an interrupt to the CPU 13A (reception interrupt). In response, the CPU 13A starts up the pre-process execution unit 28. The contents of the process may be the same as in the case of the ECU_B.

(Execution of Process B)

The process B execution unit 26 starts to execute the process B at the time of reception of the synchronization signal as the start timing. When the synchronization signal and the process A data are received at the same timing, or when the process A data is received soon after reception of the synchronization signal, the process B execution unit 26 executes the process B upon completion of the pre-process execution unit 29. Thus, the process B execution unit 26 may be implemented integrally with the pre-process execution unit 29 such that the process B execution unit 26 can be called from the pre-process execution unit 29.

On the other hand, when the data receive unit 30 receives the process A data before the synchronization signal (i.e., asynchronously), the pre-process and the process B may not be successively executed. For example, when the data transmit unit 27 transmits the process A data to the ECU_B immediately after transmission of the process A data is enabled, the pre-process execution unit 29 may execute the pre-process regardless of the process B.

Because the process B execution unit 26 executes the process B by using the synchronization signal interrupt due to the synchronization signal as a start timing, a time margin can be obtained after the pre-process and before the start of execution of the process B by the process B execution unit 26.

The data transmit unit 31 may transmit the process B data to the ECU_A via the CAN communication unit 14B either immediately after transmission of the process B data is enabled in the process B, or when a part of the process B required by the process A is completed.

Thus, because the execution of the process B is started from the time of reception of the synchronization signal as the start timing, the same sequence can be realized with the ECU_A and the ECU_B as when the processes A and B are executed by the single ECU 99. Thus, the problems of the execution of the process B, such as the process B being started during the process A or after an unwanted time after the process A, can be prevented.

(Execution of Process A)

The start timing of the process A is the same as in Embodiment 1. Namely, the process A may be started when the CPU 13A detects an interrupt, at cycle time intervals, or upon reception of the process B data from the process B.

(Operating Procedure of Electronic Control System (ECU_A and ECU_B))

Figure 8:
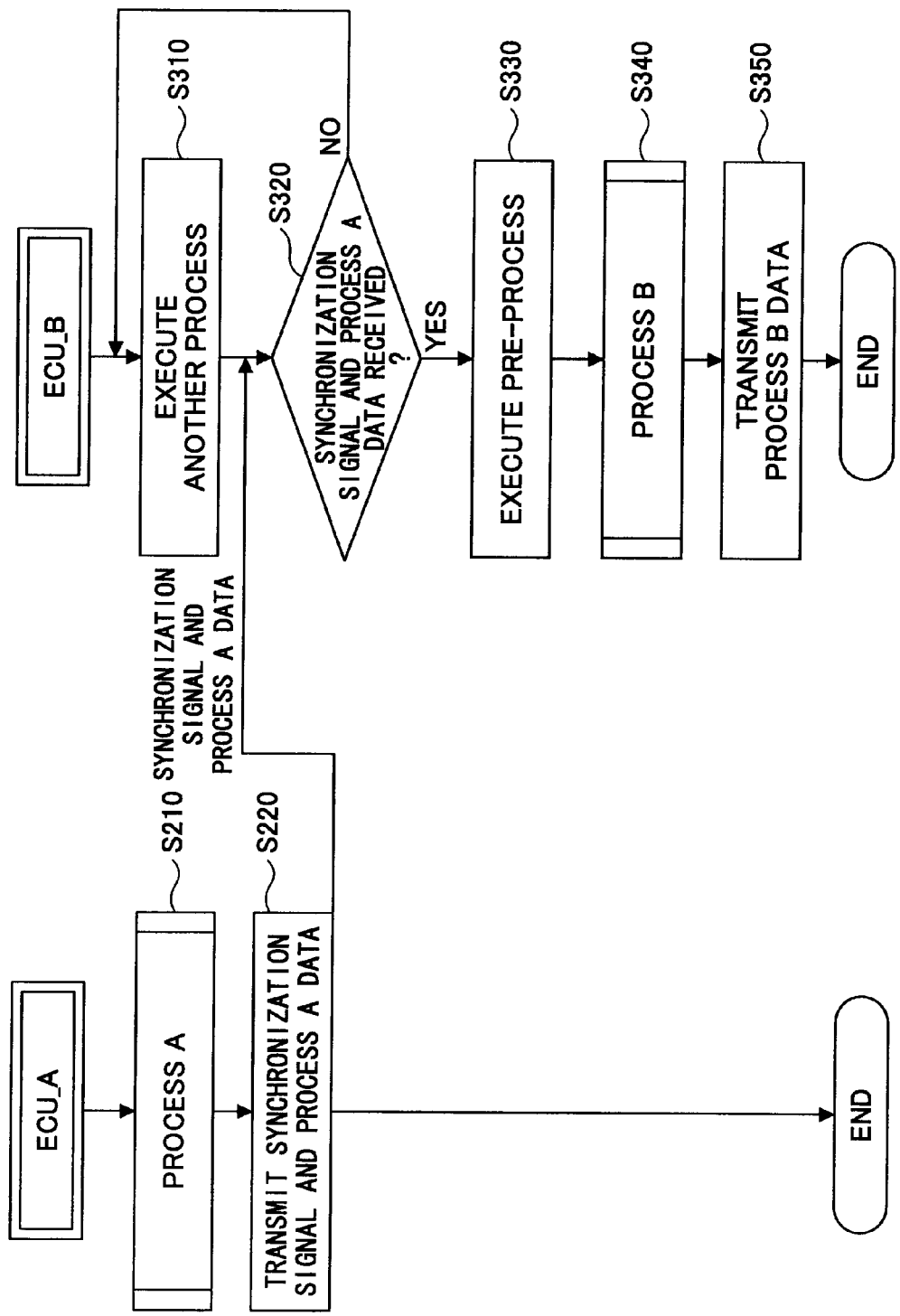
FIG. 8 is a flowchart of an example of an operating procedure of an electronic control unit system (Embodiment 2)

FIG. 8 is a flowchart of an operating procedure of the electronic control unit system. In the illustrated operating procedure, the ECU_A transmits the synchronization signal and the process A data together, as in the example of FIG. 6A. The operation of FIG. 8 may be started when the process A is started by the ECU_A.

When the CPU 13A executes the process A program, the process A execution unit 21 starts to execute the process A (S210).

Then, the synchronization signal transmit unit 22 transmits the synchronization signal to the ECU_B at the timing of either before, at, or after completion of the process A. The data transmit unit 27 also transmits the process A data at the same timing as the synchronization signal (S220).

On the other hand, the ECU_B executes another process or is in idle status until reception of the synchronization signal and the process A data (S310, S320).

Upon reception of the process A data by the data receive unit 30 via the CAN communication unit 14B ("Yes" in S320), the pre-process execution unit 29 starts to execute the pre-process (S330). When the synchronization signal receive unit 24 receives the synchronization signal at substantially the same timing as the reception of the process A data ("Yes" in S320), the process B execution unit 26 starts to execute the process B following the pre-process (or as soon as the pre-process is completed)(S340).

The data transmit unit 31 transmits the process B data to the ECU_A either immediately after transmission of the process B data is enabled in the process B, upon completion of the process B, or after completion of the process B (S350).

(Operating Procedure of Electronic Control System (ECU_A, ECU_B))

Figure 9:
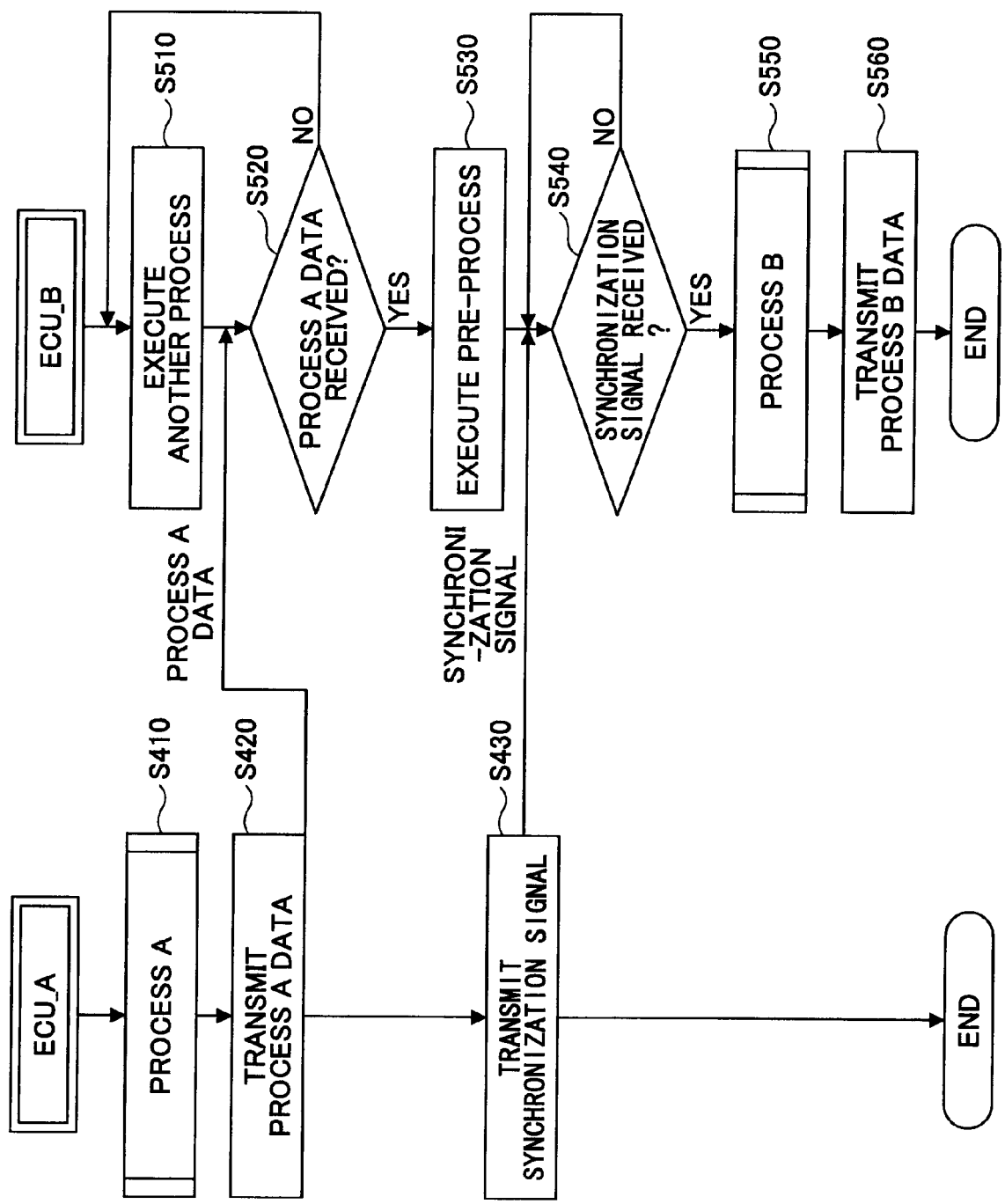
FIG. 9 is a flowchart of another example of an operating procedure of an electronic control unit system (Embodiment 2)

FIG. 9 is a flowchart of an operating procedure of the electronic control unit system. In this procedure, the ECU_A transmits the synchronization signal and the process A data asynchronously as illustrated in FIG. 6B.

When the CPU 13A executes the process A program (S410), the data transmit unit 27 transmits the process A data to the ECU_B either immediately after transmission of the process A data is enabled in the process A, or upon completion of a part of the process A required by the process B (S420).

The synchronization signal transmit unit 22 transmits the synchronization signal to the ECU_B at a predetermined timing (S430).

On the other hand, the ECU_B executes another process or is in idle status until reception of the process A data (S510, S520). Upon reception of the process A data by the data receive unit 30 from the ECU_A ("Yes" in S520), the pre-process execution unit 29 starts to execute the pre-process (S530). Thus, the pre-process required by the process B can be completed early. After the pre-process execution unit 29 has executed the pre-process and until reception of the synchronization signal, the ECU_B can execute a process other than the process B, so that the processing efficiency of the CPU 13B can be improved.

Upon reception of the synchronization signal from the ECU_A by the synchronization signal receive unit 24 ("Yes" in S540), the process B execution unit 26 starts to execute the process B (S550).

The process B execution unit 26 transmits the process B data to the ECU_A either immediately after transmission of the process B data is enabled in the process B, upon completion of the process B, or after completion of the process B (S560).

Thus, in the electronic control system 100 according to the present embodiment, the synchronization signal and the process A data are transmitted to the other ECU_B before or after the process A. In this way, the same sequence can be realized with the ECU_A and the ECU_B as when the processes A and B are executed by the single ECU while the order of execution of the processes A and B is maintained. In other words, the functions that used to be executed by the single ECU 99 can be executed with the ECU_A and the ECU_B without changing the response characteristics of the system (processes A and B) as a whole.

Embodiment 3

While in Embodiment 1 or 2 two ECU's, namely the ECU_A and the ECU_B are synchronized, three or more ECU's 50 may be similarly synchronized.

Figure 10A:
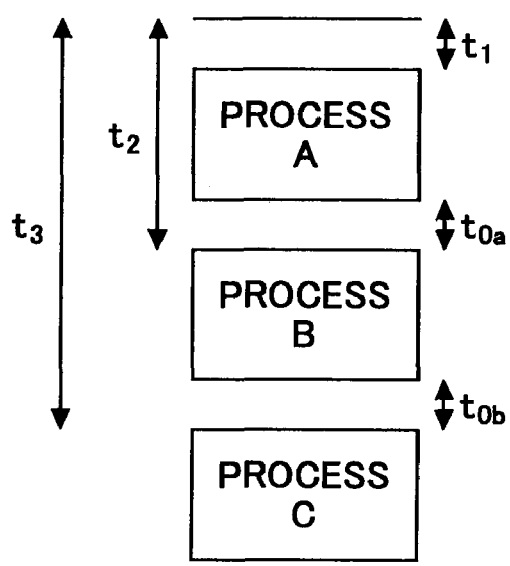
FIG. 10A illustrates an operating procedure of an electronic control unit system in which the processes A, B, and C are executed by the single ECU.

FIGS. 10A and 10B illustrate a procedure of the electronic control system 100 according to Embodiment 3 in which three processes are executed in a synchronized manner. FIG. 10A illustrates a procedure in which a process A, a process B, and a process C are executed by the single ECU 99 for comparison. The processes A and B are closely related to each other, and the processes A and C (or the processes B and C) are also closely related to each other. The ECU_A repeats the execution of the processes A, B, and C as one period. For example, the process A includes a process for determining a required torque for driving a vehicle; the process B includes a process for determining an engine rotation speed; and the process C may include a process for determining a transmission gear ratio. The electronic control system 100 controls these processes in a coordinated manner such that the execution of the process B is started within a time $t_0a$ after completion of the process A, and the execution of the process C is started within a time $t_0b$ after completion of the process B.

FIG. 10B illustrates the procedure in which the process A is executed by the ECU_A, the process B is executed by the ECU_B, and the process C is executed by the ECU_C. In accordance with the present embodiment, the ECU_A transmits the synchronization signal to the ECU_B and the ECU_C. The ECU_A starts to execute the process A after a predetermined standby time $t_1$ from the time of transmission of the synchronization signal. The ECU_B starts to execute the process B after a predetermined wait time $t_2$ from the time of reception of the synchronization signal. The ECU_C starts to execute the process C after a predetermined wait time $t_3$ from the time of reception of the synchronization signal.

As illustrated, the time $t_1$, the time $t_2$, and the time $t_3$ have a relationship such that $t_3 > t_2 > t_1$, $t_2 - t_1 = t_0a$, and $t_3 - t_2 = t_0b$. Thus, the time $t_1$, the time $t_2$, and the time $t_3$ are set such that the execution of the process B is started after the time $t_0a$ since completion of the process A, and the execution of the process C is started after the time $t_0b$ since completion of the process B.

The functional block diagram of the ECU_C may be similar to that of the ECU_B illustrated in FIG. 4 with reference to Embodiment 1, and the procedure of the ECU_C may be similar to that of the ECU_B of Embodiment 1. While the procedure of the ECU_B may be similar to that according to Embodiment 1, the ECU_B needs to complete the process B before the execution of the process C is started. Thus, the process B may be executed as a hard real-time process so that the process B can be completed within the time $t_3$ of reception of the synchronization signal.

Thus, in accordance with the present embodiment, the response characteristics of the system as a whole are not changed even when the three processes that used to be executed by the single ECU are executed by the three ECU's, i.e., the ECU_A, the ECU_B, and the ECU_C. As a result, there is no need to review the process contents (such as parameter values) of the processes A through C, thus enabling an improvement in development efficiency.

FIG. 11 illustrates an example of synchronization of processes where the same sequence as that of Embodiment 2 is executed by the three ECUs 50. The ECU_A transmits the synchronization signal to the ECU_B either before, at, or after completion of the process A. The ECU_A also transmits the process A data to the ECU_B either immediately after transmission of the process A data is enabled in the process A, or upon completion of a part of the process A required by the process B.

The ECU_B executes the process B upon issuance of a synchronization signal interrupt due to the reception of the synchronization signal. The ECU_B transmits the synchronization signal to the ECU_C either before, at, or after completion of the process B. For example, the timing corresponds to the time $t_3$ between the start of execution of the process A and the execution of the process C in the case where the processes A through C are executed by the single ECU 99. The ECU_B also transmits the process B data to the ECU_C either immediately after transmission of the process B data is enabled in the process B, or upon completion of a part of the process B required by the process C. For example, the process B data is transmitted within the time "$t_3 - t_0b$" and preferably before the time $t_3$ at the latest.

The ECU_C starts to execute the process C upon issuance of a synchronization signal interrupt due to the reception of the synchronization signal. The ECU_C transmits the process C data to the ECU_B either immediately after transmission of the process C data is enabled in the process C, or upon completion of a part of the process C required by the process A.

The ECU_C may be represented by a functional block diagram similar to that of the ECU_B of Embodiment 2 illustrated in FIG. 7. The ECU_B according to the present embodiment includes the synchronization signal transmit unit 22 and the data transmit unit 27. The operating procedure of the ECU_C may be similar to that of the ECU_B according to Embodiment 2 and is therefore not described.

Thus, as in Embodiment 2, the same sequence can be realized with the three ECU's, namely the ECU_A, the ECU_B, and the ECU_C as when the processes A, B, and C are executed by the single ECU 99 while the order of execution of the processes A, B, and C is maintained.

Thus, in the electronic control system 100 according to an embodiment, the same sequence (order and timing) can be realized with the two ECU's, i.e., the ECU_A and the ECU_B as when the processes A and B are executed by the single ECU 99 while the order of execution of the closely related processes A and B is maintained. Because the response characteristics of the system of the processes A and B as a whole do not change, there is no need to review the process contents (such as parameter values) of the processes A and B even when the processes are separated for the ECU_A and the ECU_B, thus enabling an improvement in development efficiency.

Further, in accordance with an embodiment, in plural electronic control units that execute plural processes that are closely related to each other, synchronization accuracy can be improved.

Although this invention has been described in detail with reference to certain embodiments, variations and modifications exist within the scope and spirit of the invention as described and defined in the following claims.

What is claimed is:

1. A vehicle electronic control system comprising:
a first electronic control unit configured to execute a control process A; and
a second electronic control unit connected to the first electronic control unit and configured to execute a control process B that is required to execute after execution of the control process A,
wherein the first electronic control unit includes
a synchronization signal transmit unit configured to transmit a synchronization signal to the second electronic control unit; and
a first control process execution unit configured to start execution of the control process A after transmission of the synchronization signal,
wherein the second electronic control unit includes
a synchronization signal receive unit configured to receive the synchronization signal from the first electronic control unit;
a first time measuring unit configured to measure a predetermined time Tb since reception of the synchronization signal; and
a second control process execution unit configured to start execution of the control process B when the predetermined time Tb elapses,
wherein the predetermined time Tb measured by the first time measuring unit corresponds to a time between the start of execution of the control process A and the start of execution of the control process B by a single electronic control unit in a control process in which the control process A and the control process B are controlled by the single electronic control unit.

2. The vehicle electronic control system according to claim 1, wherein the control process A and the control process B are control processes that used to be executed by the single electronic control unit.

3. The vehicle electronic control system according to claim 1, wherein the first electronic control unit is configured to control a torque of a vehicle-drive motor, and the second electronic control unit is configured to control an output of an internal combustion engine.

4. The vehicle electronic control system according to claim 1, wherein the first electronic control unit and the second electronic control unit are connected via a signal line separately from a communication line.

5. The vehicle electronic control system according to claim 1, wherein the first electronic control unit includes a second time measuring unit configured to measure a predetermined time Ta since transmission of the synchronization signal,
wherein the first control process execution unit starts executing the control process A when the predetermined time Ta elapses.

6. The vehicle electronic control system according to claim 1, further comprising a third electronic control unit configured to execute a control process C that is required to execute after execution of the control process A,
wherein the synchronization signal transmit unit transmits the synchronization signal to the third electronic control unit,
the third electronic control unit including
a second synchronization signal receive unit configured to receive the synchronization signal from the first electronic control unit;
a third time measuring unit configured to measure a predetermined time Tc since reception of the synchronization signal; and
a third control process execution unit configured to start execution of the control process C when the predetermined time Tc elapses.

7. The vehicle electronic control system according to claim 1, wherein the control process B is executed based on a process result of the control process A.

8. The vehicle electronic control system according to claim 1, wherein the second electronic control unit executes a process other than control process B during the time Tb.

9. The vehicle electronic control system according to claim 1, wherein the second electronic control unit is idle during the time Tb.

10. The vehicle electronic control system according to claim 5, wherein the first electronic control unit execute a process other than control process A during the time Ta.

11. The vehicle electronic control system according to claim 5, wherein the first electronic control unit is idle during the time Ta.

12. The vehicle electronic control system according to claim 1, wherein the first electronic control unit and the second electronic control unit have a same structure.

13. The vehicle electronic control system according to claim 1, wherein the first electronic control unit has a structure different from a structure of the second electronic control unit.

14. The vehicle electronic control system according to claim 1, wherein the first electronic control unit is connected to the second electronic control unit via a carrier sense multiple access (CSMA) network, and the synchronization signal is transmitted via the CSMA network.

15. The vehicle electronic control system according to claim 14, wherein the CSMA network is a CAN network.

16. The vehicle electronic control system according to claim 1, wherein the second electronic control unit transmits process data to the first electronic control unit, the process data being used during a next iteration of control process A.

17. A vehicle electronic control unit connected to a second vehicle electronic control unit including:
   a synchronization signal transmit unit configured to transmit a synchronization signal to the vehicle electronic control unit; and
   a first control process execution unit configured to start execution of a control process A after transmission of the synchronization signal,
   the vehicle electronic control unit comprising:
   a synchronization signal receive unit configured to receive the synchronization signal from the second vehicle electronic control unit;
   a first time measuring unit configured to measure a predetermined time Tb since reception of the synchronization signal; and
   a second control process execution unit configured to start execution of a control process B that is required to execute after execution of the control process A when the predetermined time Tb elapses,
   wherein the predetermined time Tb measured by the first time measuring unit corresponds to a time between the start of execution of the control process A and the start of execution of the control process B by a single electronic control unit in a control process in which the control process A and the control process B are controlled by the single electronic control unit.

18. A vehicle electronic control unit connected to a second vehicle electronic control unit including:
   a synchronization signal receive unit configured to receive a synchronization signal from the vehicle electronic control unit;
   a first time measuring unit configured to measure a predetermined time Tb since reception of the synchronization signal; and
   a second control process execution unit configured to start execution of a control process B that is required to execute after execution of a control process A when the predetermined time Tb elapses,
   wherein the predetermined time Tb measured by the first time measuring unit corresponds to a time between the start of execution of the control process A and the start of execution of the control process B by a single electronic control unit in a control process in which the control process A and the control process B are controlled by the single electronic control unit,
   wherein the vehicle electronic control unit comprises:
   a synchronization signal transmit unit configured to transmit the synchronization signal to the second electronic control unit; and
   a first control process execution unit configured to start execution of the control process A after transmission of the synchronization signal.

19. A vehicle control synchronization method for a vehicle electronic control system in which a first vehicle electronic control unit configured to execute a control process A is connected to a second vehicle electronic control unit configured to execute a control process B that is required to execute after execution of the control process A,
   the method comprising steps performed in the first vehicle electronic control unit of:
   a synchronization signal transmit unit transmitting a synchronization signal to the second electronic control unit; and
   after transmission of the synchronization signal, a first control process execution unit starting execution of the control process A,
   the method further comprising steps performed in the second vehicle electronic control unit of:
   a synchronization signal receive unit receiving the synchronization signal from the first electronic control unit;
   a second time measuring unit measuring a predetermined time Tb since reception of the synchronization signal; and
   a second control process execution unit starting execution of the control process B when the predetermined time Tb elapses,
   wherein the predetermined time Tb measured by the second time measuring unit corresponds to a time between the start of execution of the control process A and the start of execution of the control process B by a single electronic control unit in a control process in which the control process A and the control process B are controlled by the single electronic control unit.

* * * * *